United States Patent [19]

Gerber

[11] 4,296,293
[45] Oct. 20, 1981

[54] PROGRESSIVE WELDING AND FORGING OF OVERLAPPED SEAMS IN TUBULAR BODIES

[75] Inventor: Howard L. Gerber, Park Forest, Ill.

[73] Assignee: The Continental Group, Inc., New York, N.Y.

[21] Appl. No.: 124,414

[22] Filed: Feb. 25, 1980

[51] Int. Cl.³ .......................... B23K 13/02; H05B 6/40
[52] U.S. Cl. .................................. 219/8.5; 219/10.41; 219/10.53; 219/10.79; 219/61.11; 219/64
[58] Field of Search .................. 219/8.5, 10.79, 61.11, 219/61.13, 64, 10.41, 10.53

[56] References Cited

U.S. PATENT DOCUMENTS

| | | | |
|---|---|---|---|
| 1,748,551 | 2/1930 | Helle | 219/8.5 |
| 2,086,306 | 7/1937 | Sessions | 219/8.5 |
| 2,465,102 | 3/1949 | Joy | 219/10.53 |
| 2,841,678 | 7/1958 | Thorson | 219/8.5 |
| 3,414,697 | 12/1968 | Rudd | 219/8.5 |
| 3,591,757 | 7/1971 | Rudd | 219/64 X |
| 3,632,949 | 1/1972 | Thorne | 219/61.11 X |
| 3,832,509 | 8/1974 | Mikhailov | 219/10.79 X |
| 3,886,509 | 5/1975 | Keller | 219/10.79 X |
| 4,145,986 | 3/1979 | Bauer | 219/64 |
| 4,197,441 | 4/1980 | Rudd | 219/8.5 X |
| 4,210,477 | 7/1980 | Gillespie | 219/8.5 X |

FOREIGN PATENT DOCUMENTS 579717  8/1946  United Kingdom ............. 219/10.79

*Primary Examiner*—Arthur T. Grimley
*Assistant Examiner*—Keith E. George
*Attorney, Agent, or Firm*—Charles E. Brown

[57] ABSTRACT

This relates to a method and apparatus for welding thin walled sheet steel tubular members of the type primarily intended for use as container bodies. The sheet steel may be provided with a suitable coating, such as tin plating, and is preferably heated by induction heating. The heated edge portions of a rounded tubular member are initially pressed together to effect bonding or welding, after which they are engaged by forge rolls to reduce the thickness of the resultant seam. The pressing together of the edge portions to initiate bonding is preferably effected between two coated surfaces, such as ceramic, with the pressure being applied by one of the members in the form of a spring loaded pin. When the electrical energy is induced into the edge portions, there is provided a secondary coil having a bore therethrough through which the rounded tubular member passes with the coil serving to size and guide the tubular member. The coil has associated therewith a core structure for effecting the concentration of the electrical current in the overlapped edge portions.

30 Claims, 8 Drawing Figures

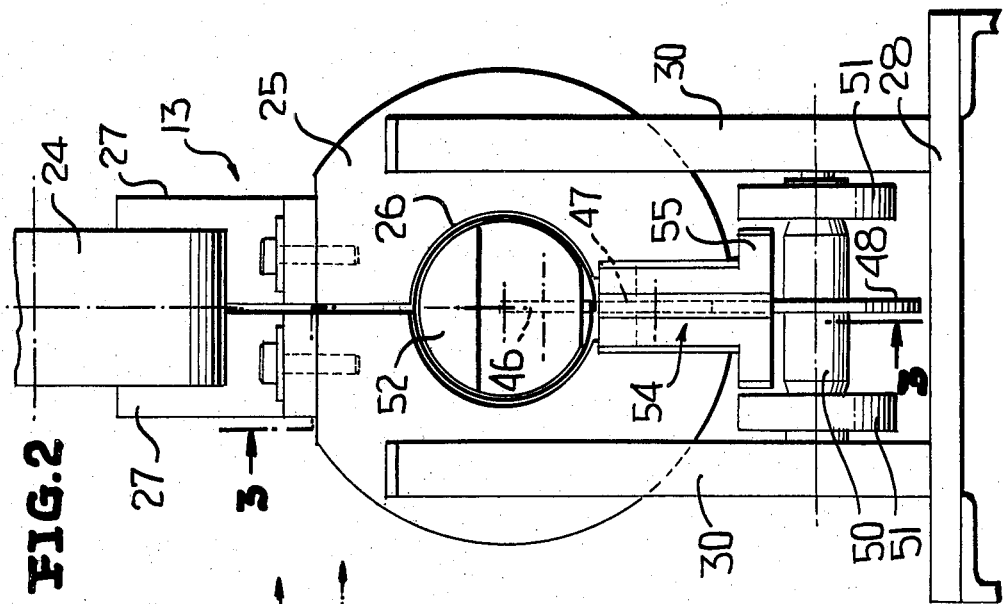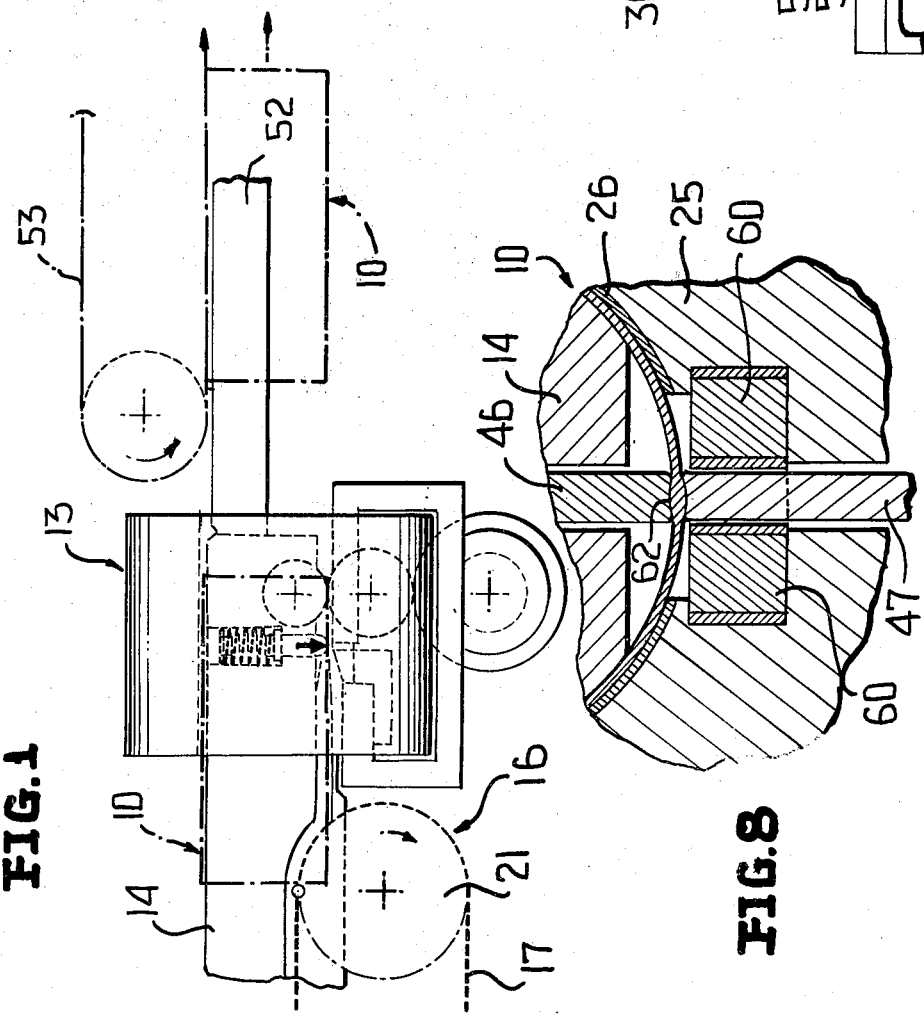

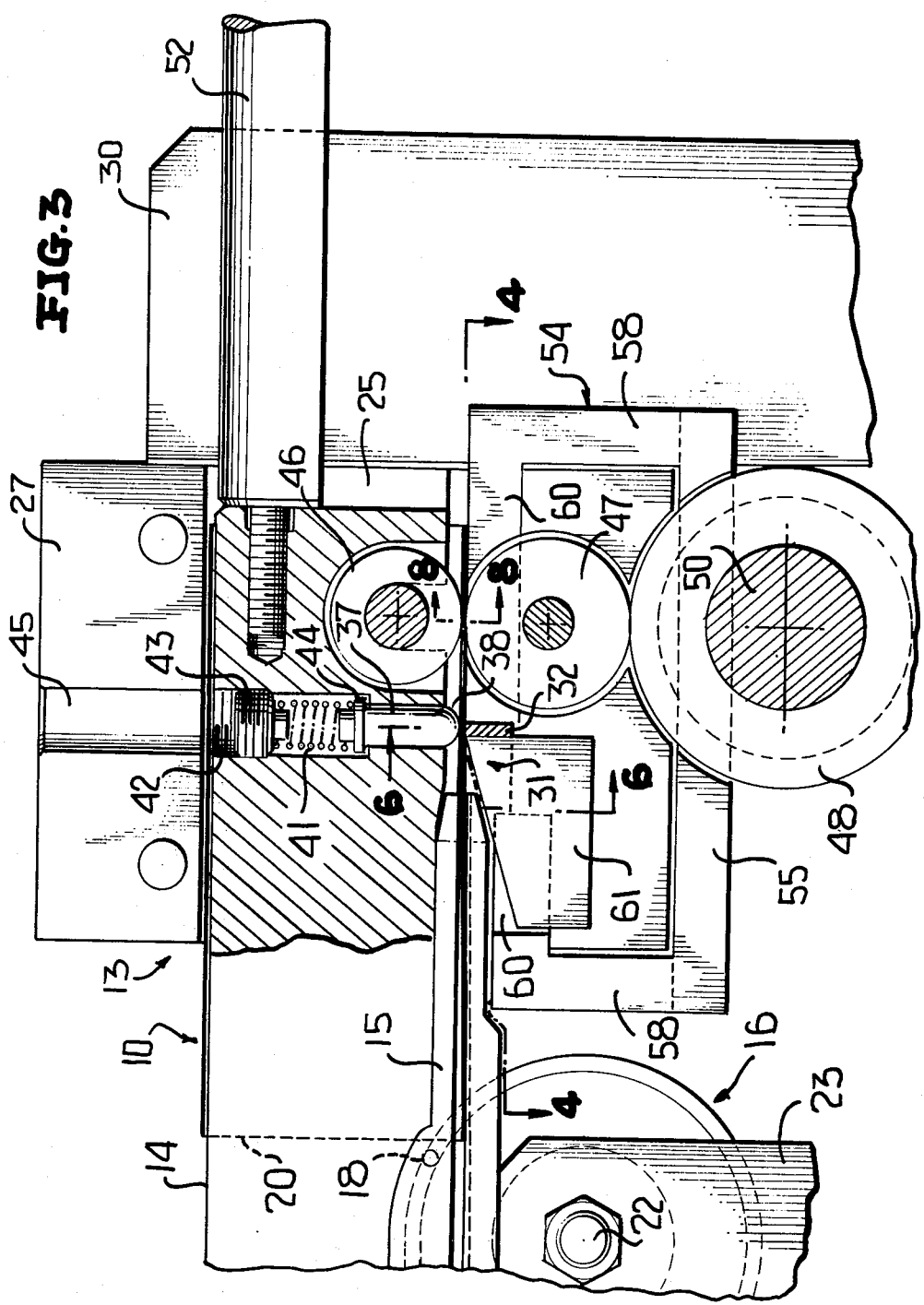

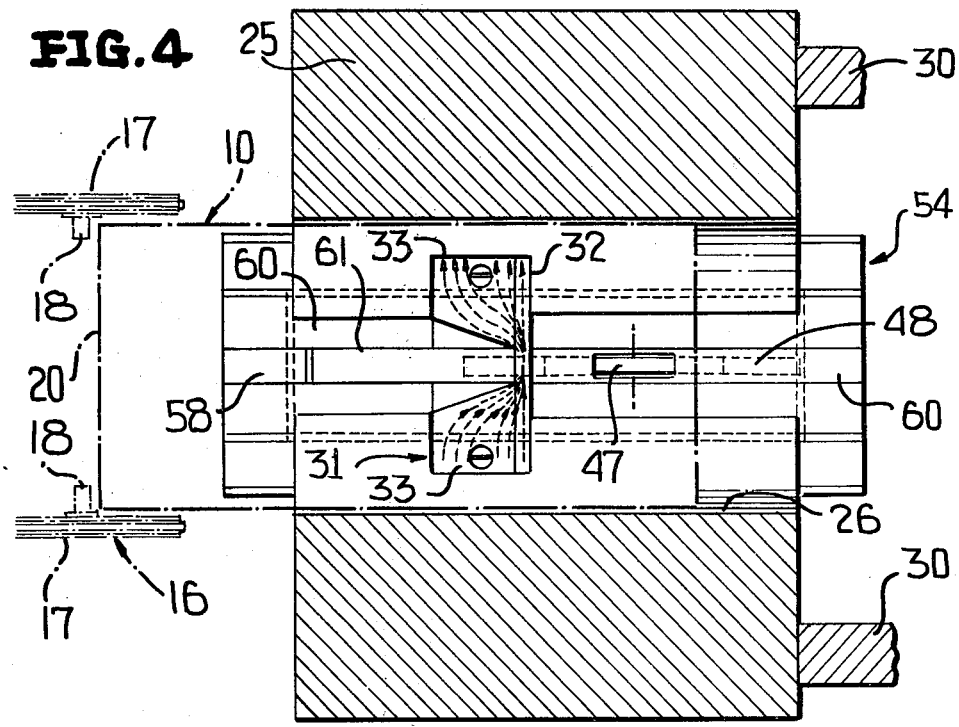
FIG.4
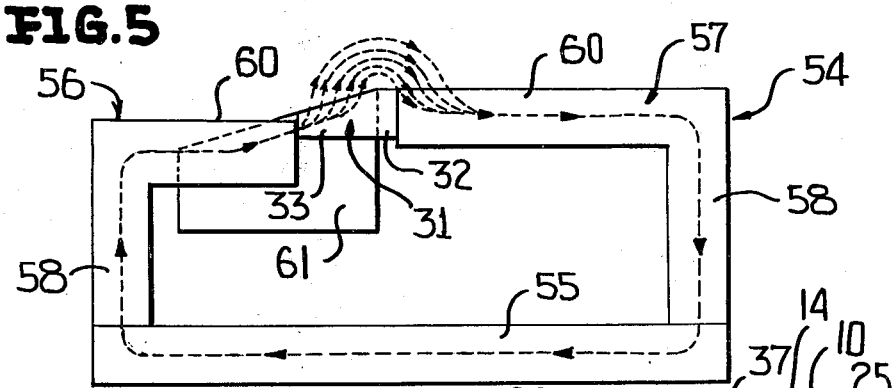
FIG.5
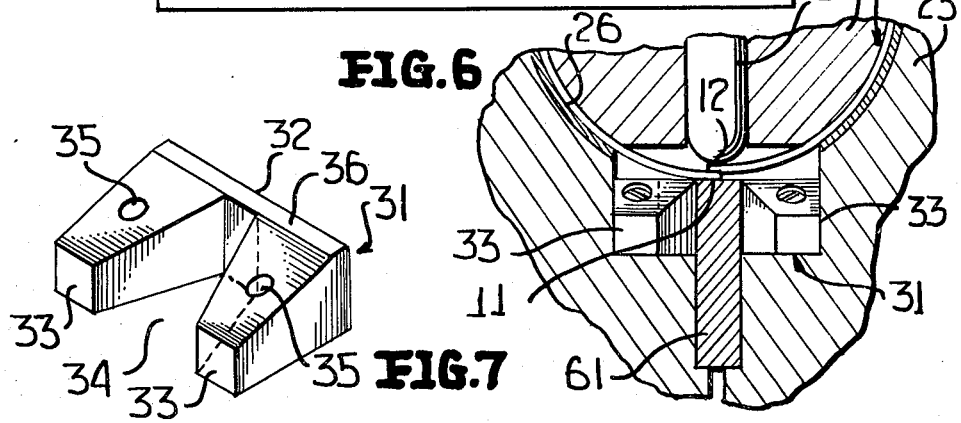
FIG.6
FIG.7

PROGRESSIVE WELDING AND FORGING OF OVERLAPPED SEAMS IN TUBULAR BODIES

This invention relates in general to use and useful improvements in welding apparatus, and more particularly to a welding apparatus for forming longitudinal side seams of tubular members formed of sheet metal.

In the past there has been developed tubular welders which, in the case of thick metal, have heated edge portions to be welded by induction heating. These tube welders, however, normally have butt joints which are permissible only with relatively thick metal.

Also, in the past there has been developed one-at-a-time can body welders wherein overlapped edges of relatively thin sheet steel are passed between a pair of roller electrodes and the overlapped edges are simultaneously heated to a welding temperature, bonded together, and forged to a limited degree. These prior welders function as desired, but have the deficiency of not being commercially suitable for welding sheet steel having coatings, including tin, thereon in that the coating material bonds to the roller electrodes and in a very short time the roller electrodes become so coated that they are inoperable to transfer the required electrical energy to the sheet material being welded.

There has also been developed welders for welding tin plated and other coated sheet steel can bodies which use continuous wire electrodes which pass over support rolls and which serve to transfer the required electrical energy into overlapped edge portions to heat the overlapped edge portions to a welding temperature, to force the overlapped edge portions together to effect welding or bonding, and to forge the overlapped edge portions to a much lesser than double thickness. These welders are deficient in the relatively high cost of the disposable wire electrodes which, after use, must be cut up and sold as salvage material.

According to this invention, it is proposed to provide a welding apparatus which will receive single can bodies, one at a time, and sufficient heat substantially only edge portions thereof to a bonding temperature, at which time the heated overlapped edge portions are first lightly pressed together to effect the required bonding or welding, after which the welded together edge portions are then forged materially to reduce the thickness of the resultant joint or seam.

Most particularly, in accordance with this invention the initial bonding pressure is effected by a ceramic finger in cooperation with a ceramic coated support wherein any coating material which may be melted during the initial bonding or welding step will not adhere to the pressing elements, and therefore there will be no detrimental buildup of the coating material.

Most particularly, in accordance with this invention it is proposed to form a can body blank into a rounded tubular member which is moved along a predetermined path and wherein the edge portions are guided under controlled conditions so that they are disposed in overlapped, radially spaced relation. Electrical energy is induced into the overlapped edge portions while they are radially spaced with there being a concentration of electrical energy at or just in advance of the point where the overlapped edge portions are brought into contact with one another. The overlapped edge portions are thus heated to a welding or bonding temperature immediately in advance of the point where the overlapped edge portions are pressed together. Thus, a maximum control of the heating of the overlapped edge portions may be effected and the fact that the edge portions have a coating thereon which may be melted during the heating will not interfere in any manner with the bonding or the apparatus which effects the bonding. The welded together overlapped edge portions may then be suitably forged to the desired thickness without the forge rolls utilized in such forging being materially affected by any build-up of the melted coating material.

With the above and other objects in view that will hereinafter appear, the nature of the invention will be more clearly understood by reference to the following detailed description, the appended claims, and the several views illustrated in the accompanying drawings.

IN THE DRAWINGS:

FIG. 1 is a schematic perspective view showing the general details of the welding apparatus and the manner in which a tubular member, such as a can body, is provided with a welded side seam by such apparatus.

FIG. 2 is an end view of the main portion of the welding apparatus, and shows generally the details thereof.

FIG. 3 is a longitudinal vertical sectional view taken generally along the line 3—3 of FIG. 2 on an enlarged scale, and shows more specifically the details of the welding apparatus.

FIG. 4 is a generally horizontal sectional view taken along the line 4—4 of FIG. 3, and shows generally the details of the induction heating apparatus and the current concentrator.

FIG. 5 is a schematic elevational view showing generally the flow of current in a core structure carried by the secondary coil.

FIG. 6 is an enlarged fragmentary vertical sectional view taken generally along the line 6—6 of FIG. 3, and shows specifically the details of the initial pressing together or bonding of the heated overlapped edge portions.

FIG. 7 is a fragmentary transverse sectional view similar to FIG. 6 in the area of the forging rolls, and shows the details of the subsequent forging operation.

FIG. 8 is a perspective view of a current concentrator for concentrating current in the overlapped edges substantially at the point of bond.

Referring now to the drawings in detail, it will be seen from FIG. 1 that there is provided a rounded tubular member 10 formed of sheet metal which has free edges 11 and 12 which are to be welded to define a longitudinal side seam. The rounded tubular member 10 is supplied in the form of a flat blank and is rounded in a conventional manner which in no way forms a part of this invention. The rounded tubular member is directed into a welding apparatus, generally identified by the numeral 13, in accordance with this invention for the purpose of welding together the edge portions 11, 12 in overlapping relation.

Suitable guide means including a horn member 14 are provided for moving the individual tubular members 10 along a predetermined path. The horn 14 carries a conventional Z-bar 15 which receives the edge portions 11 and 12 and holds them in overlapped, radially spaced relation with the edge portions 11, 12 progressively moving together in a radial direction downstream of the path of movement of the tubular members.

In order that the tubular members may be moved along a predetermined path, a suitable conveyor, generally identified by the numeral 16, is provided. The conveyor 16 preferably includes a pair of conveyor chains 17 (FIG. 4) which carry pins 18 for engaging the trailing edge 20 of a rounded tubular member 10 which is to be welded. Adjacent the welding apparatus 13, the conveyor 16 includes a pair of sprockets 21 over which the chains 17 pass. The sprockets 21 are carried by a suitable shaft or shafts 22 which are mounted on a support 23 underlying the horn 14. It is to be understood that the chains 17 are suitably driven so as to present the tubular members 10 to the welding mechanism 12 in an orderly fashion.

The welding apparatus includes a primary coil of which only a core 24 is illustrated. It is to be understood that the core 24 will have associated therewith suitable windings (not shown). The welding apparatus also includes a single turn secondary coil 25. Actually, the coil 25 is split into two halves to facilitate the mounting of components therein. The coil 25 is preferably formed of a readily electrically conductive metal such as aluminum and copper. The coil 25 has a cylindrical passage 26 therethrough.

It will be seen that the coil 25 is connected to the core 24 by suitable conductors or bus-bars 27 so that a high amperage current may be directed into the coil 25. The primary winding will be coupled to a high frequency generator (not shown) so that electrical energy having a frequency on the order of 30 kilo hertz may be directed to the primary coil.

The welding apparatus 13 is carried by a suitable support 28 which, in turn, has a pair of upstanding supports 30. The supports 30 carry the halves of the secondary coil 25.

At this time it is pointed out that the cylindrical bore 26 is of a size to receive the rounded tubular member 10 with the edge portions 11, 12 in predetermined overlapping relation. In order to prevent wear, the surfaces of the coil 25 defining the bore 26 are suitably coated with a wear resistant material such as ceramic.

Without going into the details of a current concentrator arrangement, it is pointed out here that the coil halves have extending therebetween and secured thereto a flux concentrator 31 in the form of a bridge member which is best illustrated in FIG. 8. The bridge member 31 is specifically configured to concentrate the induced electrical current into the edge portions 11, 12 with there being a maximum concentration of the electrical current in the edge portions immediately above the current concentrator.

As pointed out above, the current concentrator is in the form of a bridge which extends between the two halves of the coil 25. The current concentrator specifically includes an upstanding crossbar portion 32 which has projecting upstream a pair of pyramidal portions 33 defining therebetween a tapering gap 34 which is spaced apart at the upstream side of the crossbar portion 32. Suitable fastening receiving apertures 35 are formed in the portions 33 for securement to the halves of the coil 25.

The upper surface of the crossbar portion 32 is provided with a suitable wear resistance coating 36 such as a ceramic coating. This coating serves to permit freedom of sliding movement of the tubular members over the current concentrator 31 without wear.

Referring now to FIG. 3, it will be seen that the horn 14 carries in overlying relation to the crossbar portion 32 a pressure applying pin 37 which preferably has a semispherical lower end 38. The pin 37 is guided in a bore which is enlarged remote from the current concentrator 31 to receive a compression spring 41 with the upper portion of the enlarged bore being internally threaded as at 42 for receiving an adjustable stop member 43. The upper part of the pin 37 disposed within the enlarged bore is provided with a shoulder 44 for preventing the pin from falling through the bore.

It is to be noted that the bus-bars 27 are cut away to define a bore 45 which is aligned with the bore so as to facilitate adjustment of the stop 43 and the replacement of the pin 37 when required.

It is to be understood that the Z-bar 15 is so configurated and so positioned with respect to the pin 37 and the crossbar portion 32 so that there is a tendency for the overlapped edge portions 11, 12 to come into contact when they are centered relative to the pin 37 and the crossbar portion 32. As will be described hereinafter, the current induced into the overlapped edge portions 11, 12 is concentrated over the crossbar portion 32 at which point the edge portions 11, 12 come into contact with one another. Thus at the time the overlapped edge portions 11, 12 come into contact with one another and pass between the pin 37 and the crossbar portion 32, the overlapped edge portions are heated to a maximum temperature and are bonded together by the light pressure effected by the spring loaded pin 37. In practice, it has been found that a force of approximately 20 pounds is sufficient to load the pin 37 sufficiently to apply the necessary load on the heated overlapped edge portions 11, 12 to effect bonding or welding together of the edge portions.

In view of the fact that the upstanding crossbar portion 32 is provided with a suitable coating 36, such as ceramic and since the pin 37 is also preferably formed of a similar material including ceramic, there is no tendency for any molten metal or other material to stick thereto. Thus, the tubular member 10 may be readily formed of a coated steel sheet with the coating including tin or a like metal. Thus, even though the tin or like coating may be melted at the time it passes between the upstanding crossbar portion 32 and the pin 37, there is little tendency of the molten tin being removed and where removed it does not disadvantageously bond to either the pin or the coating 36.

When the tubular member 10 is a can body, it is not desirable that the thickness of the welded side seam be twice the thickness of the metal. Therefore, it is highly desirable that the double thickness side seam be forged so as to reduce the thickness down to a thickness on the order of 1.1 to 1.5 T. This is effected by an internal forge roll 46 in conjunction with an external forge roll 47. The internal forge roll 46 is suitably journalled within the horn 14 for driving by the welded side seam, while the external forge roll 47 is disposed externally of the horn within the coil 25. With particular reference to FIG. 2, it will be seen that the external forge roll 47 is driven by a drive roll 48 which, in turn, is carried by a shaft arrangement 50 extending between the supports 30. The shaft arrangement 50 carries a pair of drive gears 51 which are suitably driven. It is to be understood that the peripheral speed of the forge roll 47 will substantially equal or be slightly greater than that of the conveyor 16 so that the tubular members which enter into the welding apparatus 13 will be drawn therethrough by the action of the forge rolls 46, 47.

The horn 14, as is best shown in FIG. 3, is provided with a horn extension 52 which receives the welded tubular members. With reference to FIG. 1, a suitable takeaway conveyor 53 is provided for receiving and removing the welded side seam tubular members 10.

It is to be understood that in accordance with known operating conditions, the passage of the tubular member 10 through the coil 25 will result in the inducing of electrical energy into the tubular member which is formed of electrically conductive material. However, it is desired that in lieu of having the induced electrical current passing circumferentially around the tubular member to form a complete circuit, the flow of electrical energy be restricted substantially to the edge portions 11, 12 so as to provide for a concentration of the electrical energy only where heating is desired. To this end, there is associated with the current concentrator 31 a current path controlling core arrangement generally identified by the numeral 54.

As is best shown in FIG. 5, in addition to the concentrator or bridge member 31, there is a base member 55 which is disposed below the coil 25. The base member 55 has upstanding from opposite ends thereof generally angular core elements 56, 57 each of which includes a vertical leg 58 and a horizontal leg 60. The vertical legs 58 are secured to opposite ends of the base 55 while the horizontal legs 60 extend generally in opposed relation to one another. The forward end of the leg 60 of the member 57 abuts against the upstream face of the crossbar portion 32 while the end of the horizontal leg portion 60 of the member 56 terminates at the upstream ends of the portions 33. There is further provided a core block 61 which extends between the portions 33 of the concentrator 31 and has its upstream end partially within the horizontal leg 60 of the core portion 56.

It will be seen that the core arrangement 54 provides for a completion of the circuit within the secondary coil, which circuit is in part formed by the edge portions 11, 12. The net result is that there is a slight circumferential flow in the edge portions 11, 12 toward the free edges thereof, with there being a concentration of the electrical energy in overlying relation to the upper surface of the crossbar portion 32 and within the edge portions 11, 12 where the edge portions 11, 12 initially come into contact with one another and thereby complete the electrical circuit. This is clearly schematically illustrated in FIGS. 4 and 5.

It will be understood that the coil 25 has two functions. First, it performs the customary function of inducing electrical current or energy into the tubular member to be welded. Secondly, and most importantly, the coil by having the cylindrical bore 26 therethrough, serves as a combined sizing and guiding device thereby assuring a proper overlap of the edge portions 11, 12 while assuring the proper plug size of the resultant welded side seam tubular member.

The core structure 54 provides the customary controlled electrical energy circuit path with the concentrator or bridge member 31 assuring the proper concentration of the electrical current substantially only in the edge portions 11, 12 to provide for a maximum heating efficiency. At this time it is pointed out that the core structure 54 may be formed of ferromagnetic materials.

Most specifically, this invention is intended for the welding together of edge portions to form a welded side seam 62 of a tubular member formed of sheet steel which may or may not be coated. Further, the invention may be most advantageously utilized in conjunction with tubular members in the form of can bodies. The thickness of the sheet metal may range from 0.006 to 0.020 inch and slightly higher when the tubular members are can bodies, although the invention is not so limited. It is to be understood that the overlap is to be held to a relative minimum so as both to restrict the loss of material in the flattened side seam 62 and thus maintain at a minimum the forging requirements.

Although only a preferred embodiment of the invention has been specifically illustrated and described herein, it is to be understood that minor variations may be made in the welding apparatus and the method of utilizing the same without departing from the spirit and scope of the invention as defined by the appended claims.

I claim:

1. A method of forming a tubular body with a welded longitudinal seam, said method comprising the steps of providing an unseamed tubular body, axially advancing the tubular body while guiding free edges of the body into overlapped relation, introducing electrical energy into the tubular body to heat the overlapped body free edges to a bonding temperature, lightly urging the heated free edges into bonding contact substantially without deformation of the free edges, and then forging the bonded still heated overlapped edges to effect a complete welding of the overlapped edges and materially reducing the thickness of a joint between the overlapped edges.

2. The method of claim 1 wherein said lightly urging of the heated free edges into initial bonding contact is effected by a resiliently urged finger.

3. The method of claim 1 wherein said lightly urging of the heated free edges into initial bonding contact is effected by a resiliently urged finger formed of a ceramic material.

4. The method of claim 3 wherein the tubular body is a tin coated steel body.

5. The method of claim 1 wherein the unseamed tubular body has free side edges, and the side edges are guided into said overlapped relation by a Z-bar in advance of said introduction of electrical energy into the tubular body.

6. The method of claim 1 wherein said forging is effected by a pair of forge rolls at least one of which is driven to effect the feeding of the tubular body.

7. The method of claim 1 wherein said lightly urging of the heated free edges into initial bonding contact is effected by a force on the order of 20 pounds.

8. The method of claim 1 wherein said lightly urging of the heated free edges into initial bonding contact is effected by a force wherein the electrical resistance between the overlapped edges is high as compared to resistance welding between loaded electrodes.

9. The method of claim 1 wherein said electrical energy is introduced into the overlapped edge by induction.

10. The method of claim 1 wherein said electrical energy is introduced into the overlapped edge by induction by an induction coil through which the tubular body passes and within which the tubular body is shaped.

11. The method of claim 1 wherein the overlapped free edges of the tubular body are initially radially spaced.

12. The method of claim 1 wherein the tubular body is a metal body.

13. The method of claim 1 wherein the tubular body is a tin coated steel body.

14. A method of forming a tubular body with a welded longitudinal seam, said method comprising the steps of providing an unseamed tubular body, axially advancing the tubular body while guiding free edges of the body in overlapped relation, and lightly urging the overlapped free edges of the tubular body into contact with one another to provide a high electrical resistance between the overlapped free edges, introducing electrical energy into the overlapped free edges with the electrical energy being concentrated at the area of contact to effect heating of the overlapped free edges in the area of contact to a welding temperature and with said light urging of said overlapped free edges effecting bonding of the thus heated free edges together substantially without deformation of the free edges, and then forging the bonded still heated overlapped edges to effect a complete welding of the overlapped edges and materially reducing the thickness of a joint between the overlapped edges.

15. The method of claim 14 wherein said electrical energy is introduced into the overlapped edges by induction.

16. The method of claim 14 wherein the tubular body is a metal body.

17. The method of claim 14 wherein the tubular body is a tin coated steel body.

18. Apparatus for forming a welded side seam in a sheet metal tubular member, said apparatus comprising means for moving a rounded tubular member along a predetermined path with edge portions of the members in circumferentially overlapped relation, heating means disposed along said path for heating the edge portions to a welding temperature, pressing means disposed along said path adjacent said heating means for lightly urging the heated edge portions into bonded engagement, and forge means downstream of said pressing means for forging the bonded overlapped edge portions to effect a complete welding of the overlapped edge portions while materially reducing the thickness thereof.

19. The apparatus of claim 18 wherein said pressing means is in the form of a resiliently urged finger in combination with an opposed back-up element.

20. The apparatus of claim 19 wherein said finger and said back-up elements have ceramic surfaces for engaging edge portions to be bonded.

21. The apparatus of claim 19 wherein said finger is disposed within said path for engaging a radially inner one of the edge portions to be bonded.

22. The apparatus of claim 18 wherein said heater means is an electrical induction heater.

23. The apparatus of claim 18 wherein said heater means is an electrical induction heater and includes a secondary coil having a cylindrical opening therethrough of a size to guide and shape a tubular member to be welded.

24. The apparatus of claim 23 wherein said secondary coil is a split coil having a current concentrator in the form of a bridge between halves of said secondary coil in transverse radial alignment with the intended path of overlapped edge portions.

25. The apparatus of claim 24 wherein said bridge is part of an inductive loop generally lying in an axial plane.

26. The apparatus of claim 24 wherein said pressing means is in the form of a resiliently urged finger in combination with said bridge.

27. The apparatus of claim 26 wherein both said finger and an opposing part of said bridge have ceramic surfaces for engaging edge portions to be bonded.

28. The apparatus of claim 26 wherein said finger is disposed within said path for engaging a radially inner one of the edge portions to be bonded.

29. The apparatus of claim 26 wherein said bridge is part of an inductive loop generally lying in an axial plane.

30. The apparatus of claim 29 wherein said finger has an axis lying in said axial plane.

* * * * *